May 5, 1964 W. R. BARRY 3,131,938
PACKING CARTRIDGE ASSEMBLY
Filed July 8, 1960

INVENTOR.
WILLIAM R. BARRY
BY

United States Patent Office 3,131,938
Patented May 5, 1964

3,131,938
PACKING CARTRIDGE ASSEMBLY
William R. Barry, 3821 S. Utica, Tulsa, Okla.
Filed July 8, 1960, Ser. No. 41,682
5 Claims. (Cl. 277—9)

This invention relates to improvements in packing devices and more particularly, but not by way of limitation, to a combined shock absorbing and wiper ring low pressure seal assembly for a reciprocating piston, or the like.

The packing of a reciprocating plunger or piston, particularly in large pumping equipment, has long been a problem in the industry and has not heretofore been satisfactorily solved. The ramming force normally transmitted to the sealing member is usually considerably great and relatively quickly damages the sealing member beyond efficient use, thus requiring a frequent replacement thereof. This is not only costly, but results in a considerable loss of operating time for the pumping equipment. In addition, the piston frequently does not reciprocate in a true or straight path, but tends to have a slight wobble, which causes an uneven and undue wear on the sealing surface of the sealing member.

The present invention contemplates a novel packing cartridge assembly for solving this long felt need in the industry. The sealing member is provided with an integral re-enforcing member without interference to the efficient sealing qualities of the resilient sealing portion. In addition, the unit is provided with guide bushings for absorbing the shock of the untrue movement of the reciprocating piston, and for wiping the outer periphery of the piston. The packing cartridge is a non-adjusting unit. The configuration of the outer body of the cartridge provides a locking taper whereby there is no necessity for nuts, bolts, or the like, to retain the packing unit securely around the piston. Hydraulic means are provided for readily releasing the packing assembly for ease of removal thereof when it is desired to renew the packing or change the packing for any reason.

It is an important object of this invention to provide a packing cartridge assembly for precluding leakage of fluid around a reciprocating piston.

It is another object of this invention to provide a combined shock absorber and wiper ring packing assembly particularly designed and constructed for increasing the useful and efficient life of the sealing member.

Another object of this invention is to provide a novel packing unit for disposition around a reciprocal piston wherein a locking taper is utilized for securing the unit in position whereby additional bolts, nuts and the like are eliminated.

Still another object of this invention is to provide a packing unit wherein excessive wear on the sealing member due to the reciprocal movement of the piston through an untrue path is substantially eliminated.

A further object of this invention is to provide a packing unit adapted for being securely locked into position around a piston and yet which may be readily released for ease of removal thereof.

A still further object of this invention is to provide a packing cartridge assembly which is simple and efficient in operation and economical and durable in construction.

Other objects and advantages of the invention will be evident from the following detailed description, read in conjunction with the accompanying drawings, which illustrate my invention.

Figure 1:
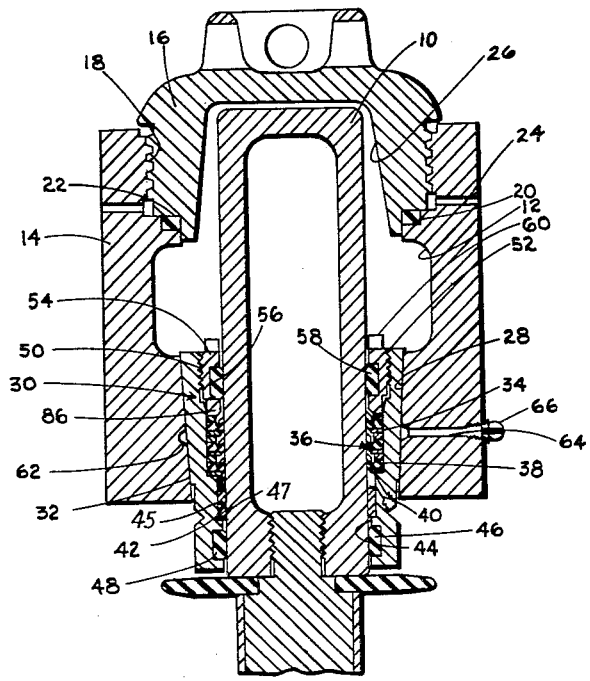
FIGURE 1 is a section al elevational view of a piston having a packing cartridge assembly embodying the invention disposed therearound.

Referring to the drawings in detail, reference character 10 generally refers to a pump piston or plunger reciprocally disposed in a bore 12 of a pump housing indicated at 14. A suitable cap member 16 is threadedly secured at 18 to the housing 14 to provide access to the interior or bore 12 for a purpose as will be hereinafter set forth. An inwardly directed annular shoulder 20 is provided on the inner periphery of the bore 12 for limiting the downward travel or movement of the cap 16, as is well known. A sealing gasket or ring 22 is interposed between the cap 16 and the shoulder 20 for precluding leakage of fluid therebetween. A plurality of circumferentially spaced radially extending bores 24 may be provided in the housing 14 to provide communication between the threaded portion 18 and the exterior of the housing, as is well known. A cavity or recess 26 is normally provided within the cap 16 for receiving the upper end of the piston 10 in the raised position thereof, as shown in FIG. 1. It is to be understood that the housing 14 and cap member 16 may be of any type as utilized in a pump, or the like (not shown), and are not limited in any manner to the particular embodiment disclosed herein.

The bore 12 is reduced at 28 and is tapered or provided with downwardly converging side walls for receiving a packing cartridge assembly generally indicated at 30. The unit or assembly 30 is of a generally annular or cylindrical configuration provided with a tapered outer periphery complementary to the tapered side walls 28 of the bore 12. The inner periphery of the unit 30, however, is substantially straight cylindrical side walls for disposition around the outer periphery of the piston 10, as will be hereinafter set forth. Thus, the assembly 30 may be tightly wedged into position around the piston 10 for a locking engagement between the piston and the bore 12 without the necessity of additional bolts, nuts and the like.

The packing cartridge 30 comprises an outer sleeve 32 provided with a tapered outer periphery complementary to the side walls of the bore 12, as hereinbefore set forth. The inner periphery or central bore 34 of the sleeve 32 is substantially larger than the outer periphery of the piston 10 for receiving a plurality of superimposed packing members 36. An inwardly directed annular shoulder or flange 38 is provided in the bore 34 for supporting the packing rings 36, as clearly shown in FIG. 1. The inner diameter of the flange 38 is preferably slightly larger than the outer diameter of the piston 10 to provide a clearance whereby there will be no interference therebetween upon reciprocation of the piston. An angularly disposed, radially extending bore 40 is provided in the side wall of the housing or sleeve 32 whereby a suitable grease fitting (not shown) may be disposed therein for supplying a lubricant to the outer periphery of the piston 10, as is well known.

The inner periphery of the bore 12 is slightly enlarged at 42 below the flange 38 to provide a fluid reservoir for maintaining an adequate supply of the lubricating fluid during the operation of the piston. The inner periphery of the sleeve 32 is reduced at 44 below the chamber 42 and is preferably slightly larger than the outer diameter of the piston. An annular wiping ring 46, preferably constructed of a suitable resilient material, but not limited thereto, is disposed in a groove 48 provided on the inner periphery 44 of the sleeve 32. The wiping ring 46 is preferably in a tight engagement with the outer periphery of the piston to effect a wiping thereof during the reciprocal movement of the piston, as will be hereinafter set forth. A guide sleeve 45 is disposed within the sleeve 32 around the piston 10 above the wiping ring 46 and is supported on an inwardly directed shoulder 47. The guide ring 45 absorbs the shock of any untrue reciprocal movement of the piston 10.

The upper end of the sleeve 32, as viewed in FIG. 1, is threaded at 50 to receive an upper bushing member 52. The inner periphery 54 of the bushing 52 is preferably slightly larger than the outer diameter of the piston 10, and is provided with a groove 56 for receiving an upper wiper ring 58 therein. The wiper member 58 is substantially identical with the lower wiping ring 46 and functions to wipe the outer periphery of the piston 10, and in addition, cooperates with the lower wiper member 46 and guide sleeve 45 for absorbing the shock of the piston during reciprocation thereof in a path veering from a true or straight movement. Thus, the effect of the wobbling movement of the piston during the reciprocation thereof is not directed against the sealing members 36. The upper end of the bushing member 52 is provided with suitable upstanding lugs 60 for cooperation with a wrench (not shown) or other suitable tool for threadedly securing the bushing into the sleeve 32, as is well known.

As hereinbefore set forth, the tapered outer periphery of the sleeve 32 cooperates with the tapered side walls of the bore 28 to provide a locking taper between the packing cartridge 30 and the housing 14. An annular groove 62 is provided in the bore 28 adjacent the sleeve 32 and in communication with a radially extending bore 64 having a suitable fitting member 66 threadedly secured therein whereby a fluid may be injected into the groove 62 for hydraulically releasing the sleeve 32 from the bore 28. The hydraulic pressure quickly releases the entire packing cartridge unit 30 from the locking engagement within the bore 28 for facilitating the removal thereof.

Figure 2:
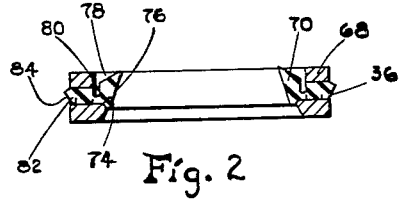
FIGURE 2 is a sectional elevational view of a packing member embodying the invention.
Figure 3:
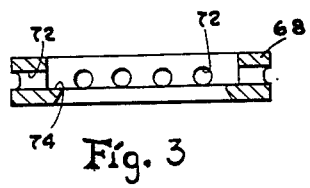
FIGURE 3 is a sectional elevational view of the re-enforcing member of the packing unit.
Figure 4:
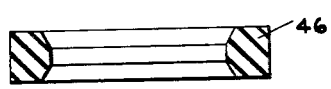
FIGURE 4 is a sectional elevational view of the guide member of the packing assembly.
Figure 5:
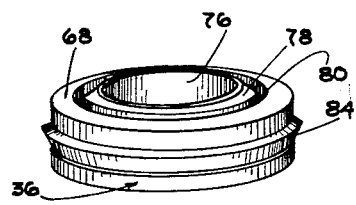
FIGURE 5 is a perspective view of the re-enforced sealing member of the packing cartridge assembly.

The packing or sealing ring members 36 are substantially identical and comprise an annular re-enforcing member 68 (FIGS. 2 and 3) bonded or otherwise integrally secured to an annular resilient sealing member 70. The re-enforcing member 68 is preferably constructed from a suitable metallic material, but not limited thereto, whereby the ramming force of the piston 10 is carried by the re-enforcing ring and is not transmitted to the resilient portion 70. The re-enforcing ring 68 is provided with a plurality of circumferentially spaced apertures or bores 72 for a purpose as will be hereinafter set forth. An inwardly directed shoulder or flange 74 is provided on the ring 68 adjacent the bores 72 for supporting the resilient portion 70 for a further strengthening thereof.

The resilient sealing member 70 is provided with an inner or central bore 76 having tapered side walls converging upwardly, as viewed in the drawaings, for cooperating with a downwardly tapered annular shoulder 78 to provide a substantially flexible sealing portion therefor. An annular recess 80 is provided in the ring 70 surrounding the tapered shoulder 78 for retaining a portion of the lubricating fluid to assure an efficient lubrication of the sealing member. A plurality of radial outwardly extending lugs or bosses 82 provided on the outer periphery of the resilient ring 70 are disposed in the bores 72 of the re-enforcing ring 68 in a manner as will be hereinafter set forth. The outer periphery of the sealing ring 70 is tapered outwardly at 84 (FIG. 2) to provide an efficient sealing adjacent the bore 34 of the sleeve 32.

The sealing members 36 are preferably constructed by an injection molding process wherein the re-enforcing member 68 is disposed within a suitable mold and a resilient material, such as a rubber, plastic, synthetic material, or the like, in a fluid state is poured into the mold around the ring 68. The fluid material fills the cavities of the bores 72 and is bonded to the metallic surfaces in any well known manner (not shown). The fluid material is also bonded to the shoulder 74 of the ring 68, and the sealing members 36 are thus an integral unit comprising a sealing member 70 bonded to a re-enforcing ring 68.

OPERATION

The packing cartridge unit 30 may be quickly and easily assembled by placing a plurality of the sealing ring units 36 within the bore 34 of the sleeve 32. The lowermost sealing ring 36 will rest on the shoulder 38 for supporting the superimposed sealing members 36 thereabove. The bushing 52 may then be threadedly secured to the sleeve 32 whereby the lower end 86 thereof will bear against the uppermost sealing ring 36. The bushing 52 may be threadedly tightened on the sleeve 32 as desired for exerting a downward force on the sealing members 36 for assuring an efficient and tight seal between the inner periphery thereof and the outer periphery of the piston 10. The packing cartridge assembly 30 may then be inserted around the piston 10 as a unit.

The cover 16 may be removed from the housing 14 in any well known manner (not shown) to provide access to the bore 12 whereby the packing cartridge assembly 30 may be manually disposed around the piston 10 and dropped by gravity into the tapered bore 28. The complementary tapered configuration of the outer periphery of the packing cartridge 30 will provide a locking engagement thereof within the bore for securely retaining the packing unit in a sealing engagement with the piston 10 without the utilization of additional bolts, nuts and the like.

A suitable grease fitting (not shown) may be utilized, as is well known, for injecting a lubricating fluid through the bore 40 and into the proximity of the sealing members 36 for assuring an efficient lubrication between the sealing members and the piston 10 during the reciprocation of the piston. As the piston moves back and forth, or up and down within the bore 12 of the housing 14, the outer periphery thereof is wiped by the friction contact between the piston and the upper and lower wiper rings 58 and 46, respectively. In addition, the guide ring 45 functions in the manner of a bumper or shock absorber for absorbing the wobbling or uneven movement of the piston during the reciprocation thereof, thus greatly reducing the wear on the sealing members 36.

The inner periphery of the sealing members 36 is slightly flexible, as hereinbefore set forth, due to the inwardly extending lip provided by the complementary tapered surfaces 76 and 78, thus as the piston 10 moves downwardly, as viewed in FIG. 1, the lip of the sealing member 36 will tend to flex slightly downwardly, and as the piston 10 moves upwardly, the lip will tend to flex slightly upwardly due to the friction contact therebetween, thus assuring an efficient sealing around the piston at all times. The flexing of the lip portion will be slight, and in no manner reduces the useful life of the sealing member 36.

When it is desired to replace the packing cartridge unit 30 for any reason, the cover member 16 may be removed from the housing 14 and a suitable hydraulic fluid may be injected through the bore 64 into the annular groove 62. The hydraulic fluid quickly dissipates between the outer periphery of the sleeve 32 and the bore 28 whereby the entire cartridge tends to float or pop out of the bore. The packing assembly 30 may then be quickly and easily manually removed from disposition around the piston 10 and replaced, as desired.

The packing rings 36 are provided with an integral re-enforcing ring 68 which bears the ramming action of the piston 10, which is well known for the damage and destruction of sealing units, thus the ramming force is not transmitted to the resilient sealing member 70. In this manner, the efficient working life of the entire cartridge or unit 30 is greatly prolonged.

From the foregoing, it will be apparent that the present invention contemplates a novel packing cartridge unit for a reciprocating piston wherein a combined guide ring and shock absorber low pressure seal is provided. The novel packing unit may be quickly and easily locked into a sealing position around the piston without the use of additional bolts, nuts and the like. In addition, the application of hydraulic fluid between the packing assembly and the tapered bore provides for a quick release of the assembly for ease of removal. The packing cartridge assembly is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In combination with a piston reciprocally disposed within a tapered bore, a packing cartridge assembly comprising an outer housing having a tapered outer periphery complementary to the tapered bore to provide a locking position for the packing cartridge assembly around the piston, a pair of spaced wiper rings provided in the housing, a plurality of superimposed sealing members disposed within the housing, an inwardly directed shoulder provided in the housing for supporting the sealing members, bushing means threadedly secured to the housing and cooperating therewith for compression of the sealing members to provide an efficient sealing thereof, a guide sleeve disposed within the housing for reducing the wear on the sealing members, means for directing a hydraulic fluid between the tapered bore and outer housing for a release of the locking engagement of the packing cartridge assembly around the piston, means to provide lubrication to the sealing rings, and said sealing members comprising an annular re-enforcing ring having a resilient sealing portion formed integrally therewith.

2. In combination with a piston reciprocally disposed within the tapered bore of a housing, a packing cartridge assembly comprising an outer sleeve having the outer periphery thereof tapered complementary to the tapered bore to provide a locking position for the packing cartridge assembly around the piston, a pair of spaced wiper rings disposed within the sleeve and bearing against the outer periphery of the piston, a plurality of superimposed sealing rings disposed within the housing between the wiper rings and in sealing contact with the outer periphery of the piston, said sealing rings comprising a rigid annular re-enforcing ring having a resilient sealing portion formed integrally therewith, an inwardly directed shoulder provided in the sleeve for supporting the sealing members therein, bushing means secured to the sleeve for compression of the sealing members for efficient sealing thereof around the piston, a guide ring disposed within the sleeve for reducing the wear on the sealing members, means providing for lubrication of the sealing members, and means providing for a release of the locking engagement of the packing cartridge assembly around the piston.

3. In combination with a piston reciprocally disposed within the tapered bore of a housing, a packing cartridge assembly adapted for disposition within the bore around the piston, and comprising an outer sleeve having the outer periphery thereof tapered complementary to the tapered bore to provide a locking position for the packing cartridge assembly around the piston, wiper means carried by the sleeve and in friction engagement with the outer periphery of the piston, sealing means carried by the sleeve in a sealing engagement with the outer periphery of the piston, said sealing means comprising a rigid annular re-enforcing ring having a resilient sealing portion formed integrally therewith, bushing means secured to the sleeve and cooperating therewith to provide for compression of the sealing means for efficient sealing thereof, means to provide for lubrication of the sealing means, and guide means carried by the housing for reducing wear of the sealing means from the reciprocation of the piston, an annular groove provided in the tapered bore around the outer sleeve, and means for directing a hydraulic fluid to the annular groove for a release of the locking engagement of the packing cartridge assembly around the piston.

4. A molded sealing member of substantially annular configuration comprising a rigid metallic annular reinforcing ring, said ring being provided with a plurality of spaced radially extending bores, a resilient sealing ring bonded to the inner periphery of the metallic ring, said resilient sealing ring having radially extending lugs extending through said bores and bonded thereto, an annular shoulder provided on the inner periphery of the metallic ring to support a portion of the resilient sealing ring, an annular groove provided on the resilient sealing ring, adjacent the inner periphery of the metallic ring for trapping fluid therein, an inwardly directed flexible sealing lip provided on the resilient sealing ring, said lip extending at least to the plane of one surface of the metallic ring, an annular resilient portion surrounding a portion of the outer periphery of the metallic ring and bonded thereto and integrally molded to the lugs, and said outer annular resilient portion having outwardly converging tapered portions forming a circumferential sealing lip around the outer periphery of the molded sealing member.

5. A molded sealing member of substantially annular configuration comprising a rigid metallic annular reinforcing ring, an annular shoulder provided on the inner periphery of said metallic ring and spaced from end thereof, a tapered surface provided on the inner periphery of the said metallic ring and extending from the annular shoulder to the said one end for facilitating stacking of a plurality of the molded sealing members, the inner periphery of said metallic ring being of substantially straight cylindrical configuration from the shoulder to the opposite end of the metallic ring, said metallic ring being provided with a plurality of spaced bores extending radially through the straight cylindrical portion thereof, a resilient sealing ring bonded to and supported by the annular shoulder and bonded to a portion of the straight cylindrical inner periphery, a plurality of radial lugs integral with the resilient sealing ring and extending through the bores and bonded thereto, an outer resilient ring extending circumferentially around the metallic ring, said outer resilient ring being integral with said lugs and bonded to the outer periphery of the metallic ring, an inwardly directed tapered flexible sealing ring provided on the inner periphery of the inner resilient sealing ring, and an outwardly directed tapered portion provided on the outer resilient sealing ring to provide a circumferential sealing lip therefor.

References Cited in the file of this patent
UNITED STATES PATENTS

| | | |
|---|---|---|
| 2,673,103 | Tremolada | Mar. 23, 1954 |
| 2,806,721 | Fagg et al. | Sept. 17, 1957 |
| 2,819,106 | Voorhees | Jan. 7, 1958 |
| 2,884,269 | Reinke et al. | Apr. 28, 1959 |